(12) United States Patent
Yamato

(10) Patent No.: US 10,628,225 B2
(45) Date of Patent: Apr. 21, 2020

(54) RESOURCE CONFIGURATION SYSTEM, RESOURCE CONFIGURATION METHOD AND RESOURCE CONFIGURATION PROGRAM FOR SELECTING A COMPUTATIONAL RESOURCE AND SELECTING A PROVISIONING METHOD

(71) Applicant: Nippon Telegraph and Telephone Corporation, Tokyo (JP)

(72) Inventor: Yoji Yamato, Musashino (JP)

(73) Assignee: Nippon Telegraph and Telephone Corporation (JP)

( * ) Notice: Subject to any disclaimer, the term of this patent is extended or adjusted under 35 U.S.C. 154(b) by 84 days.

(21) Appl. No.: 15/742,765

(22) PCT Filed: Mar. 14, 2016

(86) PCT No.: PCT/JP2016/057978
§ 371 (c)(1),
(2) Date: Jan. 8, 2018

(87) PCT Pub. No.: WO2017/029826
PCT Pub. Date: Feb. 23, 2017

(65) Prior Publication Data
US 2018/0239642 A1 Aug. 23, 2018

(30) Foreign Application Priority Data
Aug. 18, 2015 (JP) .................... 2015-160784

(51) Int. Cl.
*G06F 9/50* (2006.01)
*G06F 9/46* (2006.01)

(52) U.S. Cl.
CPC ............ *G06F 9/505* (2013.01); *G06F 9/46* (2013.01); *G06F 9/50* (2013.01); *G06F 9/5044* (2013.01); *G06F 9/5077* (2013.01)

(58) Field of Classification Search
None
See application file for complete search history.

(56) References Cited

U.S. PATENT DOCUMENTS 6,915,518 B1 7/2005 Jacobson
9,444,762 B2 * 9/2016 Pabari .................. G06F 9/5072
(Continued)

FOREIGN PATENT DOCUMENTS

| JP | 2011-0248503 A | 12/2011 |
| JP | 2015-103094 A | 6/2015 |

(Continued)

OTHER PUBLICATIONS

Madhavapeddy et al. "Reconfigurable Data Processing for Clouds", 2011 IEEE, pp. 141-145.*

(Continued)

*Primary Examiner* — Van H Nguyen
(74) *Attorney, Agent, or Firm* — Kilpatrick Townsend & Stockton LLP

(57) ABSTRACT

A cloud service achieving high processing performance specialized in particular processing, image processing, or parallel processing is provided. A resource selection apparatus selects a computational resource from a plurality of computational resources including at least an FPGA or a GPU and a provisioning method from a plurality of provisioning methods, based on whether a performance requirement and a functional requirement from a user require that particular computational processing, image processing, or parallel processing be performed with processing performance of a certain level or higher.

7 Claims, 7 Drawing Sheets

(56) References Cited

U.S. PATENT DOCUMENTS

| | | | |
|---|---|---|---|
| 2003/0069974 A1* | 4/2003 | Lu | G06F 9/505 709/226 |
| 2013/0262923 A1 | 10/2013 | Benson et al. | |
| 2014/0143427 A1* | 5/2014 | Hohenstein | H04L 67/16 709/226 |
| 2014/0258360 A1 | 9/2014 | Hebert et al. | |
| 2014/0280918 A1* | 9/2014 | Grandhe | G06Q 30/0631 709/224 |
| 2014/0282590 A1 | 9/2014 | Cavage et al. | |
| 2015/0195213 A1 | 7/2015 | Orita | |
| 2015/0236977 A1 | 8/2015 | Terayama et al. | |

FOREIGN PATENT DOCUMENTS

| | | |
|---|---|---|
| JP | 2015-132887 A | 7/2015 |
| WO | 2014/073024 A1 | 5/2014 |

OTHER PUBLICATIONS

Orellana et al. "On the provision of SaaS-level Quality of Service within Heterogeneous Private Clouds", 2014 IEEE, pp. 146-155.*

Supplementary European Search Report, European Patent Application No. 16836818.1, dated Mar. 13, 2019.

Orellana et al., "On the Provision of SaaS-Level Quality of Service within Heterogeneous Private Clouds", 2014 IEEE/ACM 7th International Conference on Utility and Cloud Computing, IEEE, Dec. 8, 2014, pp. 146-155.

International Search Report, PCT Application No. PCT/JP2016/057978, dated Jun. 14, 2016.

Yamato, Server Structure Proposal and Automatic Verification Technology on IAAS Cloud of Plural Type Users, International Conference on Internet Studies, Jul. 16-19, 2015, 13 pgs., Tokyo, Japan.

International Preliminary Report on Patentability, PCT Application No. PCT/JP2016/057978, dated Mar. 1, 2018.

* cited by examiner

RESOURCE CONFIGURATION SYSTEM, RESOURCE CONFIGURATION METHOD AND RESOURCE CONFIGURATION PROGRAM FOR SELECTING A COMPUTATIONAL RESOURCE AND SELECTING A PROVISIONING METHOD

TECHNICAL FIELD

The present invention relates to a technique for configuring resources on a cloud. The present invention relates particularly to a technique which, in a cloud service where various kinds of resources and provisioning methods are available, selects a resource and a method for provisioning the resource to meet user's requirements and, if necessary, reconfigures the resource's configuration.

BACKGROUND ART

In recent years, there has been widespread use of a cloud service, such as an IaaS (Infrastructure as a Service) cloud service, that provisions a virtual resource of a computer system to a user. By subscription with a service provider, a user can use a virtual resource on demand, such as a virtual server, a virtual network, a virtual router, a virtual storage, or a virtual load balancer. There is for example a cloud service such as Amazon Web Services (registered trademark, http://aws.amazon.com/ec2). By causing middleware, such as an OS (Operating System), a DB (DataBase), a Web, and an electronic mailer, to run on a virtual resource, a user can build their own server without having to prepare a physical hardware device by themselves.

There has also been widespread use of open-source software for implementing IaaS. For example, there is provided a commercial cloud service based on open-source software called OpenStack (registered trademark). There is for example a commercial cloud service such as Rackspace (registered trademark, Public Cloud Powered by OpenStack, http://www.rackspace.com/cloud/).

Under such circumstances, according to classifications by provisioning method, a virtual server provided to a user by a cloud service on the market is mainly a virtual server which is a server with many CPU cores (many core CPU) virtualized using a hypervisor such as a Xen or a KVM (Kernel based Virtual Machine). A hypervisor however has a disadvantage of large overhead in the virtualization processing. In addition, there is a container-type virtual server (referred to as a container hereinbelow) with low performance degradation and a bare-metal physical server (referred to as a bare metal hereinbelow) involving no virtualization. Meanwhile, according to classifications by computational resources, there is not only a typical server having a CPU but also an FPGA (Field Programmable Gate Array) server optimized for a particular computation logic. An example thereof is a Bing Search server by Microsoft Corporation. There is also a new service provider that mounts a GPU (Graphical Processing Unit) of a typical client PC onto a cloud server to provide a server with high image processing capability as a cloud server. An example of such is a GPU instance server by Amazon Web Services.

Further, according to the classifications by provisioning method, there are block storage and object storage as virtual storage provided to a user. Further, according to classifications by storage resource, provisioning mainly conducted so far uses an HDD-based dedicated storage (e.g., VNX by EMC Corporation) to cut out virtual volumes and provide them to users. Meanwhile, some service providers have started to provide, as a virtual volume, an SSD, which has higher random IO (Input Output) performance than an HDD, or a hybrid storage of an SSD and an HDD. For example, Yahoo (registered trademark) uses a hybrid storage by Nimble Storage for its cloud storage. Further, a distributed storage such as Ceph or Swift is used for users that opt for low prices. An example of such is Konoha by GMO CLOUD K.K.

As described thus far, there are various virtual resources used in cloud services and various methods for provisioning the virtual resources. Thus, when a user selects a proper virtual server or the like according to the user's purpose of use, the performance of IaaS presumably improves, enhancing the user convenience. In a conventional cloud service, however, a virtual resource is selected from ones of the same model, and this makes it difficult to provide a proper virtual resource meeting the individual requirements of each user. For this reason, a user themselves needs to design a proper server configuration according to their functional requirement and performance requirement and then validate the performance of the server configuration, which requires high level of technical knowledge and effort.

PRIOR ART DOCUMENT

Patent Document

Patent document 1: Japanese Patent Application Publication No. 2015-103094

Non-Patent Document

Non-patent document 1: Y. Yamato, "SERVER STRUCTURE PROPOSAL AND AUTOMATIC VERIFICATION TECHNOLOGY ON IAAS CLOUD OF PLURAL TYPE SERVICERS", International Conference on Internet Studies, Jul. 18-19, 2015, Tokyo, Japan

SUMMARY OF THE INVENTION

Problem to be Solved by the Invention

To overcome the above, the technique in Patent document 1 or Non-patent document 1 may be used.

Patent document 1 is a technique for locating a virtual resource for a user in a proper physical device in a cloud service providing virtual resources. This technique, however, merely carries out scheduling to determine, for example, to which physical device a virtual server having a certain number of virtual CPUs is to be linked, and cannot provide a user with a virtual server having a high-power GPU unit or an FPGA using a provisioning method such as bare-metal or container provisioning.

Non-patent document 1 is a technique for proposing a proper provisioning method according to user's functional requirements and performance requirements in a cloud service providing bare metals, containers, and hypervisors. However, this technique proposes only a provisioning method, and cannot select a virtual resource that meets user's performance requirements and functional requirements from virtual servers including a GPU or an FPGA.

Further, Patent document 1 and Non-patent document 1 are techniques for providing a virtual resource to a user, and even if the user changes the way to use the virtual resource, cannot reconfigure the configuration of the virtual resource according to the change.

The present invention has been made in view of the above circumstances, and has an objective to provide a cloud service that achieves high processing capability specialized in particular processing, image processing, or parallel processing.

Means for Solving the Problem

To solve the above problem, a resource configuration system of the present invention is, in summary, a resource configuration system comprising a resource selection apparatus that selects a resource on a cloud and a resource reconfiguration apparatus that configures a resource or reconfigures a configuration of the resource, and the resource selection apparatus includes a reception unit that receives a requirement for the resource from a user, and a selection unit that selects a computational resource from a plurality of computational resources including at least an FPGA or a GPU and a provisioning method from a plurality of provisioning methods, based on whether the requirement requires that any of particular processing, image processing, and parallel processing be performed with processing performance of a certain level or higher.

Further, a resource configuration method of the present invention is, in summary, a resource configuration method performed by a resource selection apparatus that selects a resource on a cloud and a resource reconfiguration apparatus that configures a resource or reconfigures a configuration of the resource, the method comprising, by the resource selection apparatus, receiving a requirement for the resource from a user and selecting a computational resource from a plurality of computational resources including at least an FPGA or a GPU and a provisioning method from a plurality of provisioning methods, based on whether the requirement requires that any of particular processing, image processing, and parallel processing be performed with processing performance of a certain level or higher.

Further, a resource configuration program of the present invention is, in summary, a resource configuration program that causes a computer to function as the resource configuration system according to claim 1.

Effect of the Invention

The present invention can provide a cloud service that achieves high processing capability specialized in particular processing, image processing, or parallel processing.

MODE FOR CARRYING OUT THE INVENTION

Modes for carrying out the invention will be described below using the drawings.

[First Embodiment]

Figure 1:
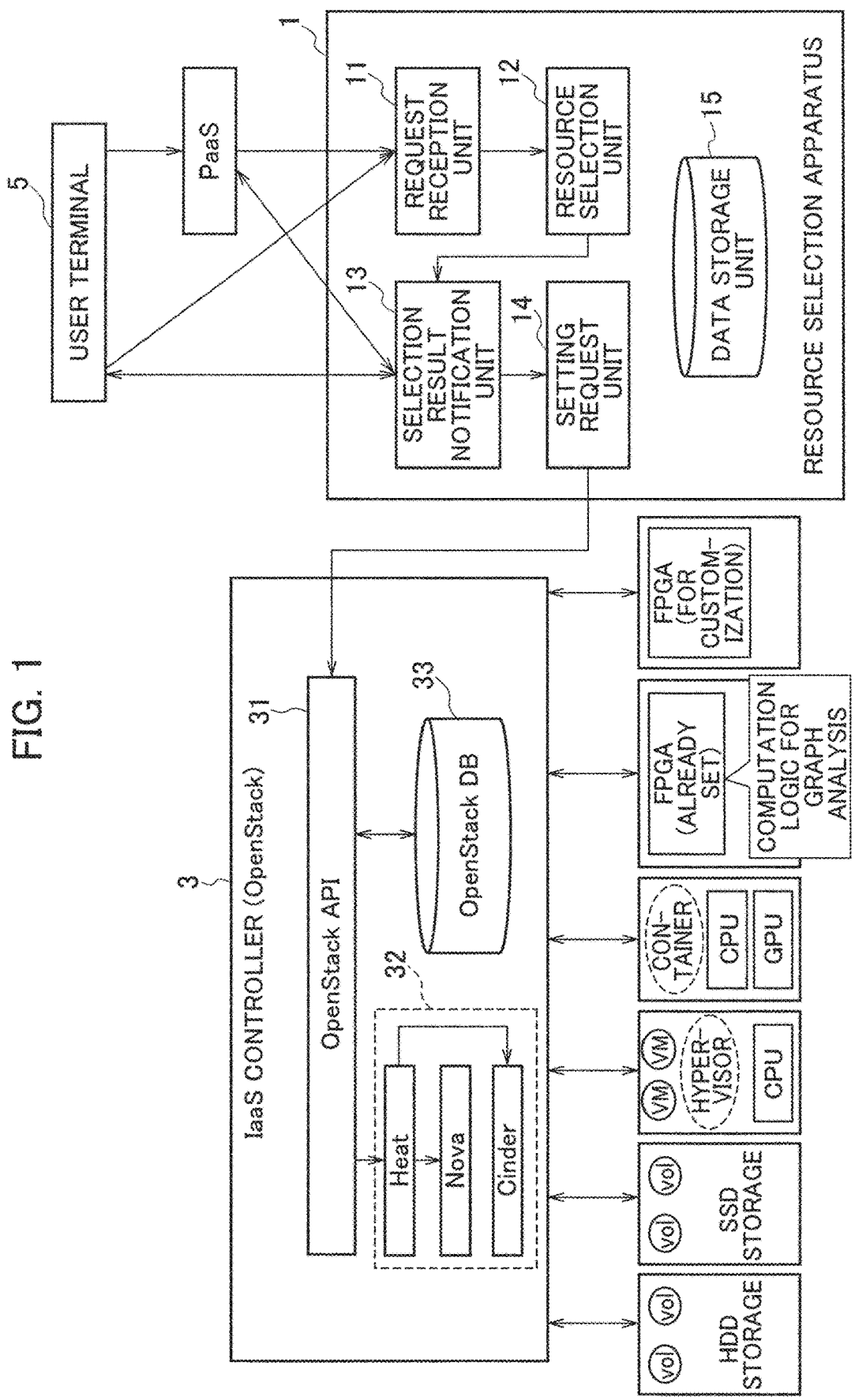
FIG. 1 is a diagram illustrating the overall configuration of a resource configuration system according to a first embodiment.

FIG. 1 is a diagram illustrating the overall configuration of a resource configuration system according to a first embodiment. This resource configuration system is placed on a cloud system, and is configured including a resource selection apparatus 1 that selects a resource and a provisioning method that match user's performance requirement and functional requirement and an IaaS controller 3 that builds the resource's configuration based on the selection results.

A description of the IaaS controller 3 is given first. The IaaS controller 3 is configured using, for example, existing OpenStack. OpenStack is an open-source software platform for cloud computing. The IaaS controller 3 can communicate with a plurality of physical devices placed on a cloud, and manages virtual resources on the cloud using virtualization software, such as Volume Manager, and manages physical resources without using virtualization software. In the present embodiment, the IaaS controller 3 is configured including an OpenStack API 31 that receives a setting request from the resource selection apparatus 1, a resource configuration builder unit 32 (such as Heat, Nova, or Cinder) that builds a resource configuration for the user based on the setting request, and an OpenStack DB 33 that stores information on various resources existing on the cloud and resource configuration information for each user.

A description of the resource selection apparatus 1 is given next. The resource selection apparatus 1 runs between a user terminal 5 and the IaaS controller 3. In the present embodiment, the resource selection apparatus 1 is configured including a request reception unit 11 that receives a performance requirement and a functional requirement that a user inputs on the user terminal 5, a resource selection unit 12 that selects a resource and a provisioning method based on the request received, a selection result notification unit 13 that notifies the user terminal 5 of the selection result, a setting request unit 14 that requests the IaaS controller 3 to set the resource based on an approval instruction from the user for the selection result, and a data storage unit 15 that stores information used in selecting a resource and a provisioning method. Information used in the selection includes information about, for example, all the resources settable in and available from the IaaS controller 3 and their provisioning methods, a request from the user terminal 5, a selection result on the resource and provisioning method based on the request, and the like.

The overall configuration of the resource configuration system has been described thus far. Note that the resource selection apparatus 1 is implementable by a computer including computation capability such as a CPU and storage capability such as memory. It is also possible to create a program for causing the computer to function and a medium for storing the program. Furthermore, the resource selection apparatus 1 may function as a device physically isolated from the IaaS controller 3, or may be part of the function of the IaaS controller 3.

Next, a description is given of all the resources and provisioning methods settable in and available from the IaaS controller 3. In other words, a description is given of the resources and provisioning methods selectable by the resource selection apparatus 1. A resource here refers to either or both of a virtual resource and a physical resource. For example, when OpenStack is used as the IaaS controller 3, a virtual resource is typically one formed by virtualization software, but a physical resource may also be selectable without the intervention of the virtualization software.

A description of provisioning methods is given first. In the present embodiment, when a resource is a computational resource, the provisioning method used is, for example, bare-metal provisioning, container provisioning, or hypervisor provisioning. On the other hand, when a resource is a storage resource, the provisioning method used is, for example, block storage provisioning or object storage provisioning.

A bare metal is a physical server that involves no virtualization, and is equivalent to a conventional Dedicated Hosting server. Hence, bare-metal provisioning means, for example, reserving a physical server involving no virtualization. In OpenStack for example, a component called Ironic performs bare-metal provisioning. Being a dedicated server, a bare metal has high flexibility and performance, but requires a long time from provisioning to activation and is incapable of live migration.

A container is a virtual server using OS virtualization technology, and is used in a VPS (Virtual Private Server) such as OpenVZ. Hence, container provisioning means, for example, reserving a virtual server using OS virtualization technology. Container provisioning virtualizes physical servers by dividing computer resources in a unit called container. Container provisioning is different from hypervisor provisioning to be described below in that it uses the kernel of the OS. Since the introduction of Docker using LXC (Linux Container) in 2013, its users have been increasing due to its usability and convenience. A container has low kernel flexibility, but requires a short time for activation and has low performance degradation because its reservation and generation processing is just to boot a process. While OpenVZ is capable of live migration, neither Docker nor LXC is capable of it presently.

A hypervisor is a technique for virtualizing a physical server using hardware virtualization technology. Hence, hypervisor provisioning means, for example, reserving a virtual server using hardware virtualization technology. Hypervisor provisioning operates on hardware emulated with hardware virtualization technology and therefore can customize the OS freely. Main examples of a hypervisor include Xen, KVM, and VMware ESX. Such a virtual server has high OS flexibility and is also capable of live migration. On the other hand, this virtual server is inferior to a bare metal and a container in terms of performance and activation time due to its large emulation overhead.

A description of a computational resource is given next. The present embodiment uses, for example, a CPU, a GPU, or an FPGA.

A CPU is a typical computational resource incorporated in many servers or client PCs, and its design features low delay. A CPU includes a large cache memory, sophisticated control capability, and powerful computational capability. In a cloud server in particular, a many-core CPU having more than ten CPU cores is often used.

A GPU is a computational unit for image processing, and its design features high throughput. A GPU includes a small cache memory, simple control capability, and energy-efficient computational capability, and has computational units arranged to execute a large amount of computation in parallel for high throughput. A GPU is often incorporated in a client PC, but also incorporated in a server for running an image processing application.

An FPGA is an integrated circuit designed so that its configuration can be set or changed by a customer or a designer after manufacturing, and is one of programmable logic devices. An FPGA is advantageous in that its functions can be updated after shipping, its design is partially reconfigurable, and engineering cost is lower than that for an ASIC design. An FPGA is not suitable for general-purpose processing, but can achieve processing performance higher than a CPU or a GPU when its logic is configured as a particular configuration. For the same particular type of computation processing suitable for an FPGA, an FPGA offers processing performance several times higher than a GPU and 10 to 100 times higher than a CPU. An FPGA has been used mainly in the scientific academic field heretofore, but is now used also in a cloud server to speed up search processing or NoSQL Engine processing. An FPGA is used in, for example, Bing Search by Microsoft corporation and NoSQL Engine by IBM.

A description is given of a storage resource next. The present embodiment uses, for example, an HDD, an SSD, a hybrid storage, and a distributed storage.

An HDD (Hard Disk Drive) is a typical storage resource incorporated in many servers or client PCs. A typical HDD-based storage performs striping with HDD parallelization to improve IO (Input Output) performance. For example, a typical 15,000-rpm (rotation per minute) HDD, which does approximately random write 150 to 200 IOPS, can do 3,000 to 4,000 IOPS with an arrangement of twenty HDDs. However, as the number of HDDs arranged in parallel increases, cost increases for power and space. Further, to add an HDD or to replace a damaged HDD, the storage casing has to be turned off, requiring service outage.

An SSD (Solid State Drive) is a storage resource that uses flash memory or the like. The random IO performance of an SSD is several-thousand IOPS and higher than that of an HDD, but its sequential IO performance is lower than that of an HDD. Moreover, an SSD has high cost per unit volume and is low in durability. For these reasons, it is costly and difficult to prepare a volume for a cloud user using only SSD storage. At present, in a cloud, an SSD is used mainly for an application requiring IOPS of OLTP (Online Transaction Processing) or the like, and is rarely used for a file server or the like.

A hybrid storage is a storage resource which is based on the characteristics of each of an HDD and an SSD and utilizes their respective advantages. For example, Nimble Storage employs a scheme called CASL (Cache Accelerated Sequential Layout). In CASL, in write, data is written first on an SSD, compressed and converted into a format that supports sequential access, then written on an HDD, and partially cached. In read, data is searched for first in the SSD and the cache and finally in the HDD, and a response is returned. CASL thus achieves random IOPS comparable to or higher than that for a regular SSD. Hybrid storages have been actively studied since late 2000s, there are many studies and products other than ones by Nimble. For example, refer to "Extending SSD Lifetimes with Disk-Based Write Caches" (G. Soundararajan and three others, FAST 2010: 8th USENIX Conference on File and Storage Technologies, February 2010.).

A distributed storage is a storage resource that uses an IA (Intel Architecture) server. A large-capacity, scalable storage system is built by parallel arrangement of inexpensive IA servers. In recent years, the capacity and the number of drives that can be incorporated in an IA server have been increasing, and by causing software to manage the drives of the group of IA servers uniformly, SPOF (Single Point Of Failure) of a single storage, bottleneck, and service outage during maintenance such as addition are prevented. SSDs can be used as drives used, but SATA (Serial Advanced Technology Attachment) HDDs are usually used from a cost perspective. Software for configuring a distributed storage multiplexes copies of a piece of data on a plurality of nodes and is capable of automatically performing rearrangement upon addition or regeneration upon failure. Examples of a distributed storage used as a file system include GlusterFS, Ceph, GFS, and HDFS. Examples of a distributed storage used as an object storage include OpenStack Swift.

Resources and provisioning methods selectable by the resource selection apparatus 1 have been described above. In the present embodiment, the characteristics and performances of such resources and provisioning methods are compared and examined in advance for each resource and for each provisioning method. Then, a certain set of necessary-condition determination criteria is defined hierarchically for performance requirements and functional requirements that a user wants, a resource and a provisioning method are specified according to results of determination for each criterion, and a resource and a provisioning method that match the conditions requested by the user are selected. The present embodiment can thus place a proper resource and a proper provisioning method according to user requirements and provide a resource and a provisioning method offering processing performance that satisfies the user requirements.

Figure 2:
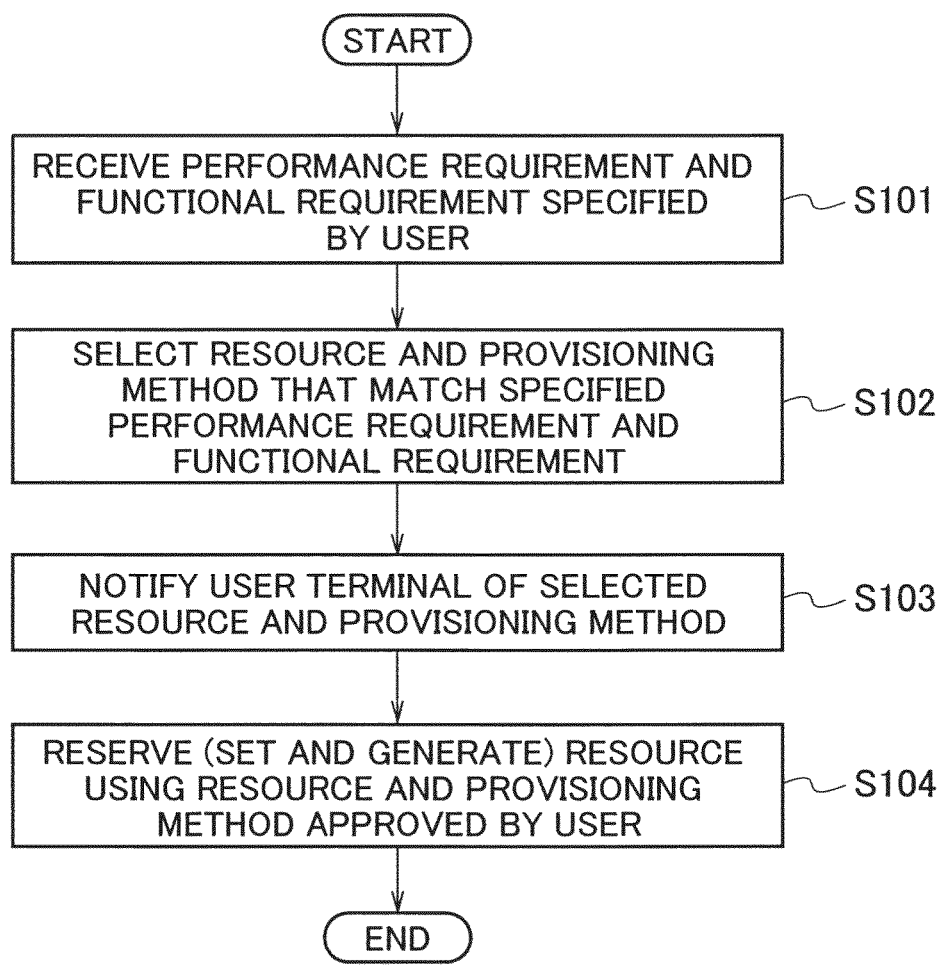
FIG. 2 is a flowchart of processing to select a resource and a provisioning method.

Next, a description is given of how the resource selection apparatus 1 operates. FIG. 2 is a flowchart of processing to select a resource and a provisioning method. Herein, a use case where a cloud provider proposes a resource and a provisioning method is assumed. It is also assumed that a user has only a low level of know-how of performance design and device selection.

First, the request reception unit 11 receives a performance requirement and a functional requirement specified by a user on the user terminal 5 (Step S101). Instead of being specified directly to the resource selection apparatus 1, the requirements may be specified via PaaS (Platform as a Service) (see FIG. 1). PaaS is a platform for managing execution of applications on a cloud. An application can also be deployed via this PaaS. For example, Cloud Foundry is used. A functional requirement is information about whether the OS is or is not Linux, whether the kernel needs to be customized, what kind of application is to be operated, and the like. A performance requirement is information about throughput, latency, and the like.

Next, from a plurality of resources and a plurality of provisioning methods, the resource selection unit 12 selects a resource and a provisioning method that match the performance requirement and the functional requirement specified in Step S101 (Step S102). Specifically, in view of the characteristics and performances of the resources and provisioning methods selectable by the resource selection apparatus 1, necessary-condition determination criteria are defined in advance hieratically for user requirements based on the characteristics and performances. Then, a determination is made on the specified performance requirement and functional requirement based on each of the necessary-condition determination criteria, and a resource and a provisioning method are selected according to the determination results. For a computational resource, a provisioning method selected is either bare-metal provisioning, container provisioning, or hypervisor provisioning, and a server device selected is either a server mainly with a regular CPU, a server with an enhanced GPU, or a server with an FPGA optimized for particular computational processing. For a storage resource, a provisioning method selected is either block storage provisioning or object storage provisioning, and a storage device selected is either an HDD-based storage, an SSD-based storage, an HDD-SSD hybrid storage, or a distributed storage such as Ceph. A specific example of a procedure for selecting the resource and provisioning method will be given later.

Next, the selection result notification unit 13 sends the user terminal 5 the resource and provisioning method selected in Step S102 (Step S103). Receiving them, the user terminal 5 displays the received resource and provisioning method on the screen as a proposed resource and a proposed provisioning method. The user of the user terminal 5 checks the proposal, and if the proposal has no problem, returns an approval instruction to the resource selection apparatus 1.

Finally, the setting request unit 14 specifies the resource and provisioning method approved by the user and requests the IaaS controller 3 to set and generate the resource (Step S104). Then, the IaaS controller 3 reserves the resource based on the request from the resource selection apparatus 1.

Next, a description is given of a specific procedure for selecting a resource and a provisioning method performed in Step S102. Here, a procedure for selecting a computational resource is described with reference to FIG. 3.

First, the resource selection apparatus 1 determines whether the functional requirement and the performance requirement from the user require that particular computational processing be performed with processing performance of a certain level or higher (Step S102a).

If the determination result in Step S102a is Yes, the resource selection apparatus 1 selects a server having an FPGA that can execute the particular computational processing at a high speed, and selects bare-metal provisioning as a method for provisioning the server (Step S102b). Examples of the speeding up using an FPGA include a method of speeding up memcached or speeding up Bing Search by Microsoft. Since merits of an FPGA cannot be fully utilized with virtualization, bare-metal provisioning is used. Note that a method for speeding up memcached is described in ["Thin Servers with Smart Pipes: Designing SoC Accelerators for Memcached", http://bit.ly/1BBNBEI, ISCA, 2013].

If, on the other hand, the determination result in Step S102a is No, the resource selection apparatus 1 then determines whether the functional requirement and the performance requirement from the user require that image processing (or parallel processing) be performed with processing performance of a certain level or higher (Step S102c).

If the determination result in Step S102c is Yes, the resource selection apparatus 1 selects a server with an enhanced GPU, and selects bare-metal or container provisioning as a method for provisioning the server (Steps S102e and S102f). A determination on which provisioning method to select is made based on the level of processing performance required for the computational resource or whether the OS needs to be customized (Step S102d). Bare-metal provisioning is selected if the determination result in Step S102d is Yes, and container provisioning is selected if the determination result in Step S102d is No. Note that an application that uses image processing performs video editing, processing, analysis, or the like. A GPU in most servers has not been enhanced as much as one in a client PC before, but now, there are also servers with an enhanced GPU. A GPU cannot be controlled with a virtual machine since hardware is abstracted. Thus, bare-metal or container provisioning is used. However, since a container often limits the OS to Linux, such as with the case of an LXC or Docker container, bare-metal provisioning is necessary for OSs other than Linux. Meanwhile, container technology usable when the OS is Windows has been introduced in recent years, and using this technology, container provisioning can be used even when the OS is Windows.

If, on the other hand, the determination result in Step S102c is No, the resource selection apparatus 1 selects a server with a regular CPU and selects bare-metal, hypervisor, or container provisioning as a method for provisioning the server (Steps S102i, S102j, and S102k). A determination on which provisioning method to select is made based on the level of processing performance required for the computational resource (e.g., high throughput or low delay) or whether the OS needs to be customized (Steps S102g and S102h). If the determination result in Step S102g is Yes, bare-metal provisioning is selected. If, on the other hand, the determination result in Step S102g is No, and also the determination result in Step S102h is Yes, hypervisor provisioning is selected. If the determination result is No in both Step S102g and Step S102h, container provisioning is selected.

Figure 3:
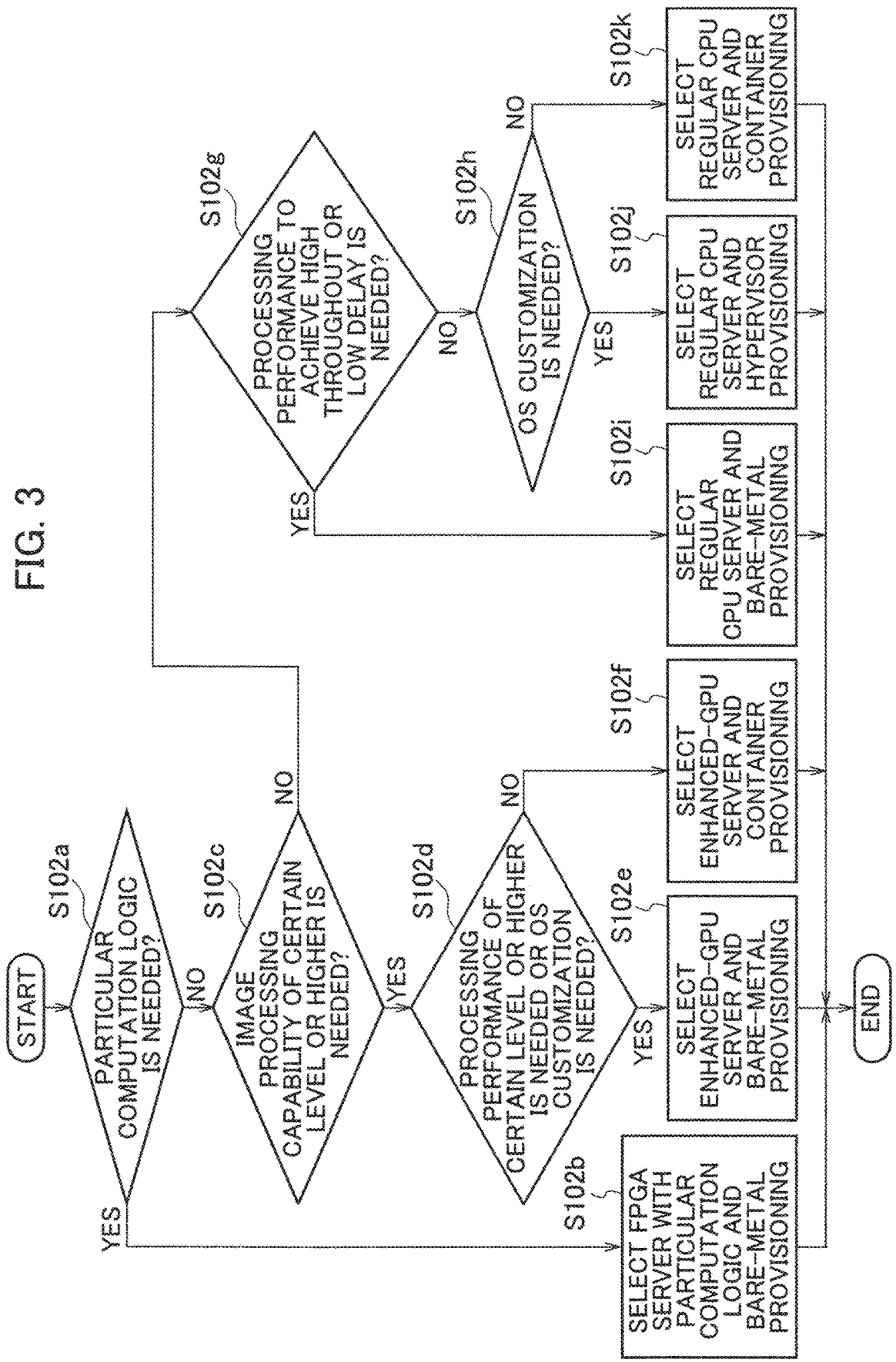
FIG. 3 is a flowchart of processing to select a computational resource.

A case of selecting a computational resource has been described above. It should be noted that the order of the steps shown in FIG. 3 is just an example. The order of the steps may be changed, such as, for example, performing Step S102c before Step S102a.

Similarly, in the case of a storage resource, necessary-condition determination criteria are defined in advance hieratically based on the characteristics and performances of storage resources and provisioning methods, and a computational resource and a provisioning method that match the specified performance requirement and functional requirement are selected. Specifically, based on a functional requirement specified by a user, block storage provisioning or object storage provisioning is selected as a provisioning method. Block storage manages data in bulk in the unit of a block. Object storage manages data in the unit of an object. Object storage is generally inexpensive. Thus, if a user specifies object storage as a functional requirement, distributed storage such as OpenStack Swift is selected. If on the other hand, a user specifies block storage as a functional requirement, the storage is selected according to the characteristics of the application program to run. For an application requiring high IO performance, such as OLAP, an SSD-based or HDD-SSD hybrid storage is selected according to the performance requirement. For an application not requiring high IO performance, such as a file server or archives, an HDD-based or distributed storage is selected according to the performance requirement. Generally speaking, storage price decreases in the order of SSD>HDD-SSD hybrid>HDD>distributed storage, and the least expensive storage that meets the performance requirement is selected.

As described, the resource selection apparatus 1 of the present embodiment selects a certain computational resource from a plurality of computational resources including at least an FPGA and a GPU, a certain storage resource from a plurality of storage resources, and a certain provisioning method from a plurality of provisioning methods based on whether a performance requirement and a functional requirement from a user require that particular computational processing, image processing, or parallel processing be performed with processing performance of a certain level or higher. Thus, the present embodiment can provide a cloud service that offers high processing performance specialized in the particular computational processing, image processing, or parallel processing, and further, saves the user from labor and effort for designing server configuration and the like.

Moreover, the resource selection apparatus 1 of the present embodiment selects a storage resource according to the characteristics of an application program to run. Thus, among various types of storages such as an HDD and an SSD, a storage having high IO performance, such as an SSD, can be presented to a user who wants to execute processing that requires high IO performance such as OLAP.

Furthermore, among a CPU, a GPU, an FPGA, and the like, if particular computational processing is to be executed at a high speed, the resource selection apparatus 1 of the present embodiment selects bare-metal provisioning for hardware including an FPGA optimized for that computation, and if image processing is to be executed at a high speed, the resource selection apparatus 1 of the present embodiment selects bare-metal or container provisioning for hardware with an enhanced GPU. In other cases, the resource selection apparatus 1 of the present embodiment selects bare-metal, container, or hypervisor provisioning for a regular CPU server. This enables the user to attain high processing performance on the computational resource.

[Second Embodiment]

The first embodiment describes a method for selecting a resource and a provisioning method. On the other hand, a second embodiment describes a method for selecting and configuring a resource according to a request from a user and then reconfiguring the resource's configuration when the way the user uses the resource changes.

Figure 4:
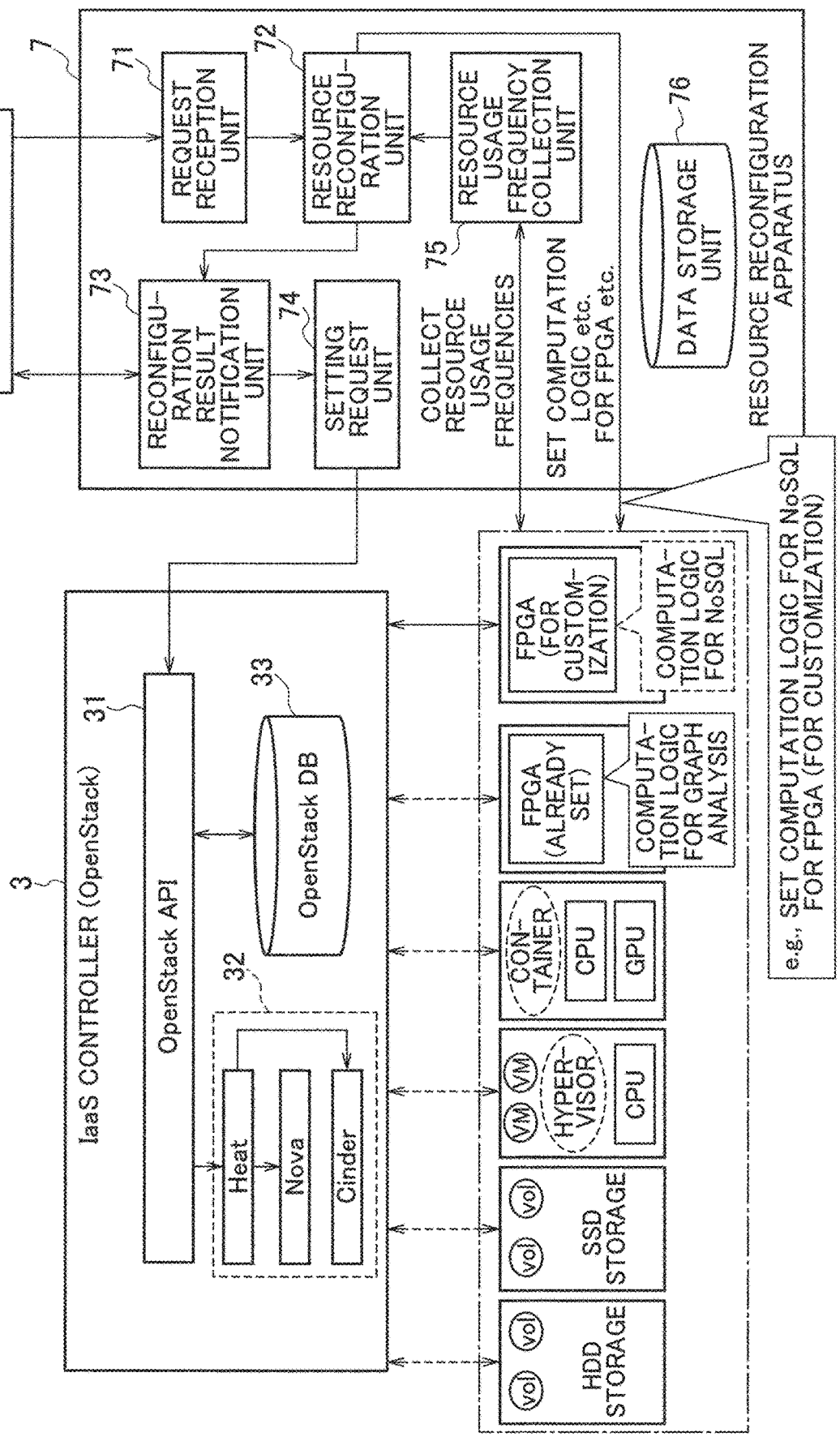
FIG. 4 is a diagram illustrating the overall configuration of a resource configuration system according to a second embodiment.

FIG. 4 is a diagram illustrating the overall configuration of a resource configuration system according to the second embodiment. This resource configuration system is configured including a resource reconfiguration apparatus 7 that configures and reconfigures a resource and a provisioning method and an IaaS controller 3 that builds or rebuilds the resource's configuration based on the configuration or reconfiguration result.

A description is given next of the resource reconfiguration apparatus 7. The resource reconfiguration apparatus 7 is configured including a request reception unit 71 that receives a performance requirement and a functional requirement that a user inputs on the user terminal 5, a resource reconfiguration unit 72 that configures or reconfigures a resource and a provisioning method based on the request received, a reconfiguration result notification unit 73 that notifies the user terminal 5 of the configuration or reconfiguration result, a setting request unit 74 that requests the IaaS controller 3 to set the resource based on an approval instruction from the user for the configuration or reconfiguration result, a resource usage frequency collection unit 75 that collects usage frequency indicating how often the user uses the configured or reconfigured resource, and a data storage unit 76 that stores therein information to be used for configuration or reconfiguration of a resource and a provisioning method.

Note that the resource reconfiguration apparatus 7 is implementable by a computer having computation capability such as a CPU and storage capability such as memory. It is also possible to create a program for causing the computer to function and a medium for storing the program. Further, the resource reconfiguration apparatus 7 may function as a device physically isolated from the resource selection apparatus 1 or the IaaS controller 3 or may be part of the function of the resource selection apparatus 1 or the IaaS controller 3.

Next, a description is given of how the resource reconfiguration apparatus 7 operates. Here, a case of reconfiguring a computation logic in an FPGA is described. The aim of this is to optimize the computation logic in the FPGA according to how the user is actually using the resource, in view of the fact that it is costly to prepare a plurality of FPGAs each including a computation logic suitable for a particular purpose.

Herein, an operation example is described using two operation patterns. In the first operation pattern, a computation logic for an FPGA is configured. In the second operation pattern, a computation logic for an FPGA is reconfigured while the user is operating a resource.

Figure 5:
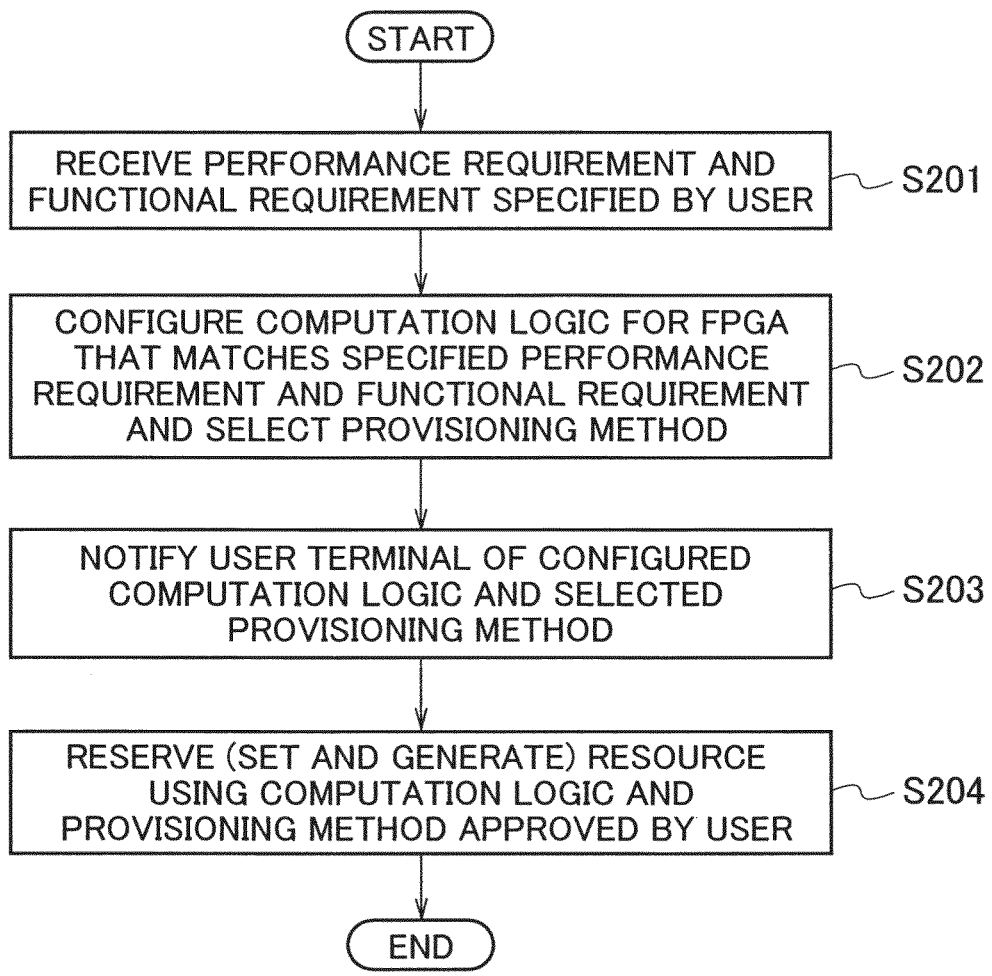
FIG. 5 is a flowchart of processing to configure a computation logic for an FPGA server.

The first operation pattern is described first. FIG. 5 is a flowchart of processing to configure a computation logic for an FPGA server.

First, the request reception unit 71 receives a performance requirement and a function requirement specified by a user on the user terminal 5 (Step S201). Note that a functional requirement is information about whether a computation logic requiring high speed is needed, what kind of application is to be operated, and the like. A performance requirement is information about throughput, latency, and the like.

Next, based on the performance requirement and the function requirement specified in Step S201, the resource reconfiguration unit 72 configures a computation logic for an FPGA server and selects a provisioning method (Step S202). Specifically, the resource reconfiguration unit 72 selects an unused FPGA server and sets a computation logic according to the specified performance requirement and functional requirement. If a computation logic requiring high speed is not specified, the computation logic may be configured according to the type of application. The configuration processing is implementable using a publicly known technique. For example, acceleration in NoSQL by an FPGA is described in "Data Engine for NoSQL—IBM Power Systems Edition White Paper" and the like. The resource reconfiguration apparatus 7 may be predefined to configure a computation logic as described in this document. It typically takes only approximately several tens of milliseconds to configure or reconfigure an FPGA, and no problem would be caused by configuration or reconfiguration according to user requirements. A specific example of a procedure for configuring a computation logic for an FPGA server will be described later. Note that bare-metal provisioning is selected as a provisioning method as it is in Step S102b in FIG. 3 since the target here is an FPGA server.

Next, the reconfiguration result notification unit 73 sends the user terminal 5 the computation logic for the FPGA configured and the provisioning method selected in Step S202 (Step S203). Receiving them, the user terminal 5 displays the received computation logic and provisioning method on the screen as a proposed resource and a proposed provisioning method. The user of the user terminal 5 checks the proposal, and if the proposal has no problem, returns an approval instruction to the resource selection apparatus 1. If the proposal has a problem, the user may specify and return a computation logic to set for the FPGA.

Finally, the setting request unit 74 specifies the resource and provisioning method approved by the user and requests the IaaS controller 3 to set and generate the resource (Step S204). Then, the IaaS controller 3 reserves the resource based on the request from the resource selection apparatus 1. Thereby, the computation logic configured and provisioning method selected in Step S202 are used by the unused FPGA server.

Figure 6:
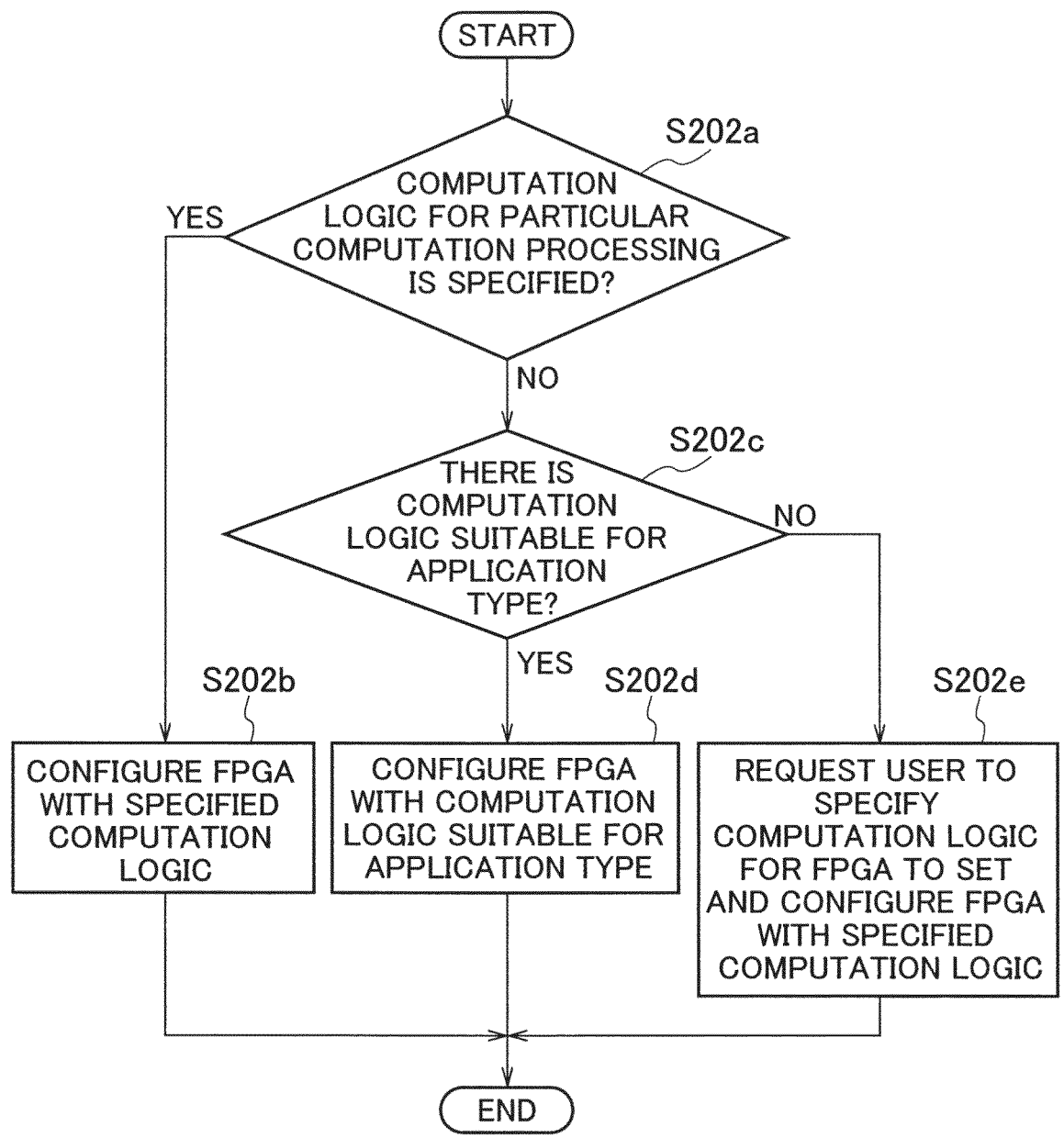
FIG. 6 is a flowchart of processing to configure a computation logic for an FPGA server.

Now, a description is given of a specific procedure for the configuration of a computation logic performed in Step S202. FIG. 6 is a flowchart of processing to configure a computation logic for an FPGA server.

First, the resource reconfiguration apparatus 7 determines whether the functional requirement and the performance requirement from the user specify a computation logic for particular computation processing (Step S202a).

If the determination result in Step S202a is Yes, the resource reconfiguration apparatus 7 configures an FPGA server using the specified particular computation logic (Step S202b). If, on the other hand, the determination result in Step S202a is No, the resource reconfiguration apparatus 7 determines whether a computation logic corresponding to the type of application specified by the user is usable on the resource configuration system (Step S202c).

Thereafter, if the determination result in Step S202c is Yes, the resource reconfiguration apparatus 7 configures an FPGA server using the computation logic corresponding to the type of specified application (Step S202d). If, on the other hand, the determination result in Step S202c is No, the resource reconfiguration apparatus 7 presents at least one usable computation logic to the user, and configures an FPGA server using the computation logic specified in response to the presentation (Step S202e).

To reflect the specified configuration in an FPGA, development tools developed by, for example, the developers of FPGAs, such as Altera Corporation and ILINX, Inc., may be used.

A description has been given of the first operation pattern. Although a computation logic is newly set for an FPGA in this first operation pattern described, this case can also be applied to a case of changing an already-set computation logic as will be described later by reading "configuration" in FIGS. 5 and 6 as "reconfiguration".

Figure 7:
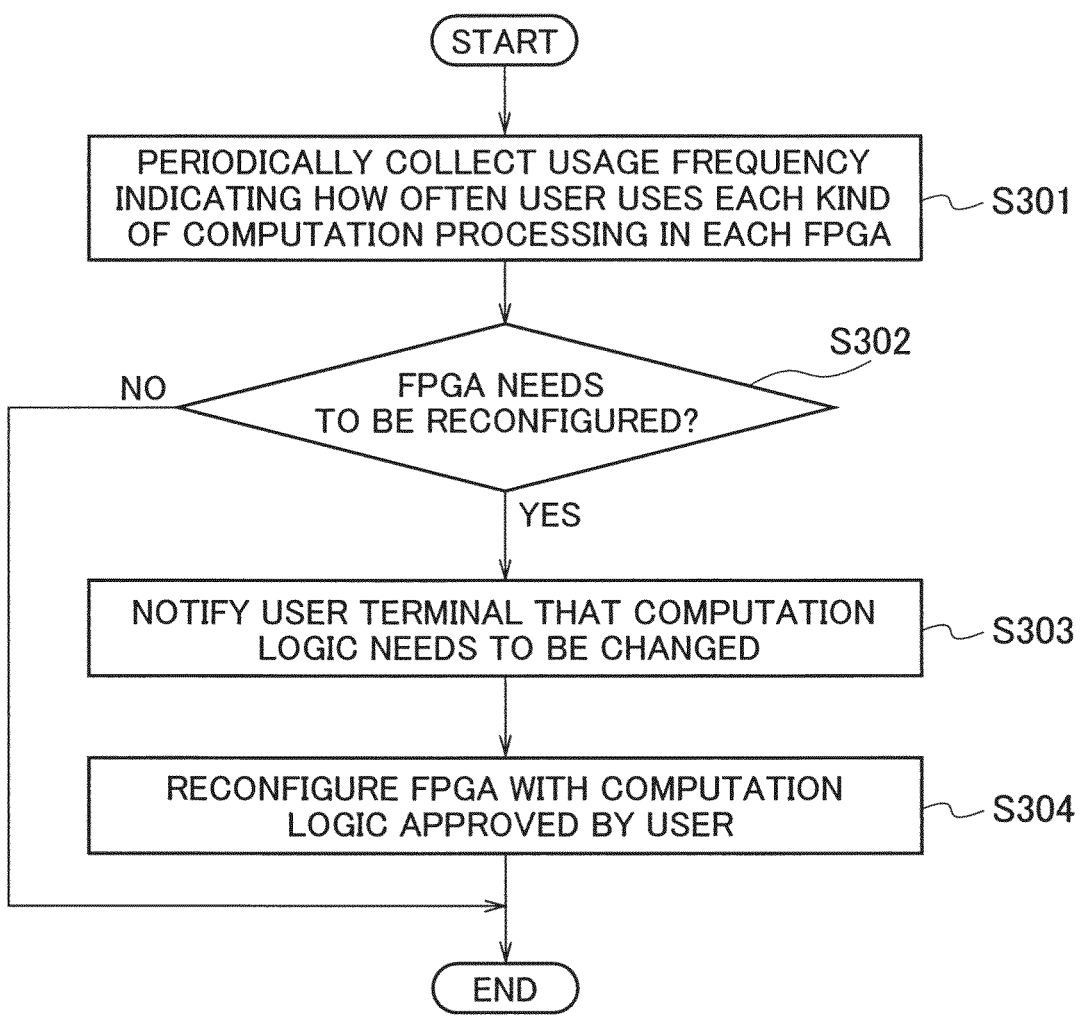
FIG. 7 is a flowchart of processing to reconfigure a computation logic for an FPGA server.

Now, the second operation pattern is described. As described earlier, in this second operation pattern, a computation logic for an FPGA is reconfigured while the resource is being operated by a user. FIG. 7 is a flowchart of processing to reconfigure a computation logic for an FPGA server. For example, this second operation is performed after the first operation.

First, the resource usage frequency collection unit 75 periodically collects usage frequency for each type of computation processing that the user is using in an FPGA server (Step S301). For example, for each FPGA server, the resource usage frequency collection unit 75 collects counts such as the number of graph analyses per hour and the number of CRUD processes of NoSQL per hour.

Next, the resource reconfiguration unit 72 detects computation processing specialized by each FPGA server based on the type of computation logic set in the FPGA server, checks the type of the detected computation processing specialized by the FPGA server against the counts of various kinds of computation processing performed by the FPGA server, and determines based on the check results whether the FPGA server should be reconfigured (Step S302). For example, if graph analysis is performed ten times per hour and CRUD processing of NoSQL is performed 10,000 times per hour on an FPGA server specialized in graph analysis, it is better to reconfigure the FPGA server into one specialized in NoSQL processing. Thus, if, for example, the number of computations of a type other than the specializing one exceeds a certain threshold, it is determined in Step S302 that it is better to reconfigure the FPGA server. Note that an FPGA server specialized in graph analysis is an FPGA server for which a graph-analysis computation logic is set.

After it is determined in Step S302 that it is better to reconfigure the FPGA server, the reconfiguration result notification unit 73 sends the user terminal 5 a notification indicating that the computation logic should be changed (Step S303). In the above example for instance, the reconfiguration result notification unit 73 proposes to the user that it is better for the computation logic for graph analysis set in the FPGA server to be changed to a computation logic for NoSQL. The reconfiguration result notification unit 73 presents the reason for that as well. Receiving the notification, the user terminal 5 displays, on the screen, the received proposal to change the computation logic. The user of the user terminal 5 checks the proposal and if the proposal has no problem, returns an approval instruction to the resource selection apparatus 1. If the proposal has a problem, the user may specify and return a computation logic to set for the FPGA, or return an instruction not to perform reconfiguration.

Finally, the resource reconfiguration unit 72 selects the FPGA server used by the user and changes the computation logic of the FPGA server based on the approval result from the user, so that the computation logic with an increased number of computations may be performed faster (Step S304). In the above example, the computation logic for graph analysis is changed to a computation logic for NoSQL for which usage frequency has increased. It typically takes only several tens of milliseconds to reconfigure an FPGA, and no problem would be caused by reconfiguration while an FPGA server is in operation.

A description has been given of a case of configuring and reconfiguring a computation logic in an FPGA. Of course, it is also possible to make a change between FPGA servers having different computation logics, between computation or storage resources of different types, or between different provisioning methods based on a performance requirement and a functional requirement changed by a user or how often the user uses the computational resource.

The second operation pattern has been described above. This second operation pattern may be applied to an FPGA server provisioned by the resource selection apparatus 1 used in the first embodiment and optimized for particular computation processing in advance.

According to the present embodiment described above, the resource reconfiguration apparatus 7 changes settings of an FPGA server to optimize it for a particular computation logic according to user's requirements and performs bare-metal provisioning, and the user can thus attain high processing performance.

Further, in the present embodiment, when a user is performing system operation on an FPGA server, the resource reconfiguration apparatus 7 collects usage frequency for each of various kinds of computation processing that the user is using on the FPGA server, and if particular computation processing is being used more often than before due to a change in the way the user uses the FPGA server, the resource reconfiguration apparatus 7 changes the configuration of the FPGA server to be suitable for the increased computation processing. This enables the user to attain high processing performance on the FPGA server, and also, reduces the necessity to prepare a plurality of FPGA servers with different computation logics.

Finally, while the first and second embodiments describe a method for proposing a proper resource configuration in response to requirements from a user, the user needs to actually check whether the proposed resource configuration is sufficient. To this end, it is conceivable to use a performance validation apparatus for validating the performance of the proposed resource configuration. For example, Non-patent document 1 includes a system for automatic validation of the performance of a server configuration proposed by a service provider, and a user can easily perform performance validation using such a system.

EXPLANATION OF THE REFERENCE NUMERALS 1 resource selection apparatus
11 request reception unit
12 resource selection unit
13 selection result notification unit
14 setting request unit
15 data storage unit
3 IaaS controller
31 OpenStack API
32 resource configuration builder unit
33 OpenStack DB
5 user terminal
7 resource reconfiguration apparatus
71 request reception unit
72 resource reconfiguration unit
73 reconfiguration result notification unit
74 setting request unit
75 resource usage frequency collection unit
76 data storage unit
S101 to S104, S102a to S102k, S201 to S204, S202a to S202e, and S301 to S304 step

The invention claimed is:

1. A resource configuration system comprising:
a CPU (Central Processing Unit); and
a memory connected to the CPU, wherein the memory stores computer instructions which are executed by the CPU to:
select a resource on a cloud; and
configure the resource or reconfigure a configuration of the resource,
receive a requirement for the resource from a user terminal,
select a computational resource from a plurality of computational resources including at least an FPGA (Field Programmable Gate Array) or a GPU (Graphical Processing Unit) and selects a provisioning method from a plurality of provisioning methods, based on whether the requirement requires that any of particular processing, image processing, and parallel processing be performed with processing performance of a certain level or higher;
collect usage frequency for each of various kinds of computation processing that the user is using on an already-configured computational resource, and
change the configuration of the already-configured computational resource as suited for particular computation processing the usage frequency of which has increased,
wherein the plurality of provisioning methods include bare-metal provisioning for provisioning a physical server without virtualization, container provisioning for provisioning a virtual server using OS (Operating System) virtualization, or hypervisor provisioning for provisioning a virtual server using hardware virtualization technology.

2. The resource configuration system according to claim 1, wherein when the requirement requires that the particular processing be performed with the processing performance of the certain level or higher, the instructions further executed by the CPU to select the FPGA as the computational resource and selects bare-metal provisioning as the provisioning method for the computational resource.

3. The resource configuration system according to claim 1, wherein when the requirement requires that the image processing or the parallel processing be performed with the processing performance of the certain level or higher, the instructions further executed by the CPU to select the GPU as the computational resource and selects bare-metal provisioning or container provisioning as the provisioning method for the computational resource, based on the level of the processing performance to be achieved by the computational resource or whether OS customization is necessary.

4. The resource configuration system according to claim 1, wherein the instructions further executed by the CPU to select a block-based provisioning method or an object-based provisioning method based on the requirement, and selects a storage resource according to a characteristic of an application program to run.

5. The resource configuration system according to claim 1, wherein the instructions further executed by the CPU to set, in a computational resource with an FPGA, a computation logic suitable for the requirement from the user, and causes the computational resource to use the computation logic.

6. A resource configuration program stored in the memory, the program executed by a computer to function as the resource configuration system according to claim 1.

7. A resource configuration method comprising:
selecting a resource on a cloud;
configuring the resource or reconfiguring a configuration of the resource;
receiving a requirement for the resource from a user;
selecting a computational resource from a plurality of computational resources including at least an FPGA (Field Programmable Gate Array) or a GPU (Graphical Processing Unit) and selecting a provisioning method from a plurality of provisioning methods, based on whether the requirement requires that any of particular processing, image processing, and parallel processing be performed with processing performance of a certain level or higher, wherein the plurality of provisioning methods include bare-metal provisioning for provisioning a physical server without virtualization, container provisioning for provisioning a virtual server using OS (Operating System) virtualization or hypervisor provisioning for provisioning a virtual server using hardware virtualization technology:
collecting usage frequency for each of various kinds of computation processing that the user is using on an already-configured computational resource, and
changing the configuration of the already-configured computational resource as suited for particular computation processing the usage frequency of which has increased.

* * * * *